May 1, 1923.
J. E. MOTE
1,453,804
RESILIENT VEHICLE TIRE
Filed April 4, 1918
3 Sheets-Sheet 1
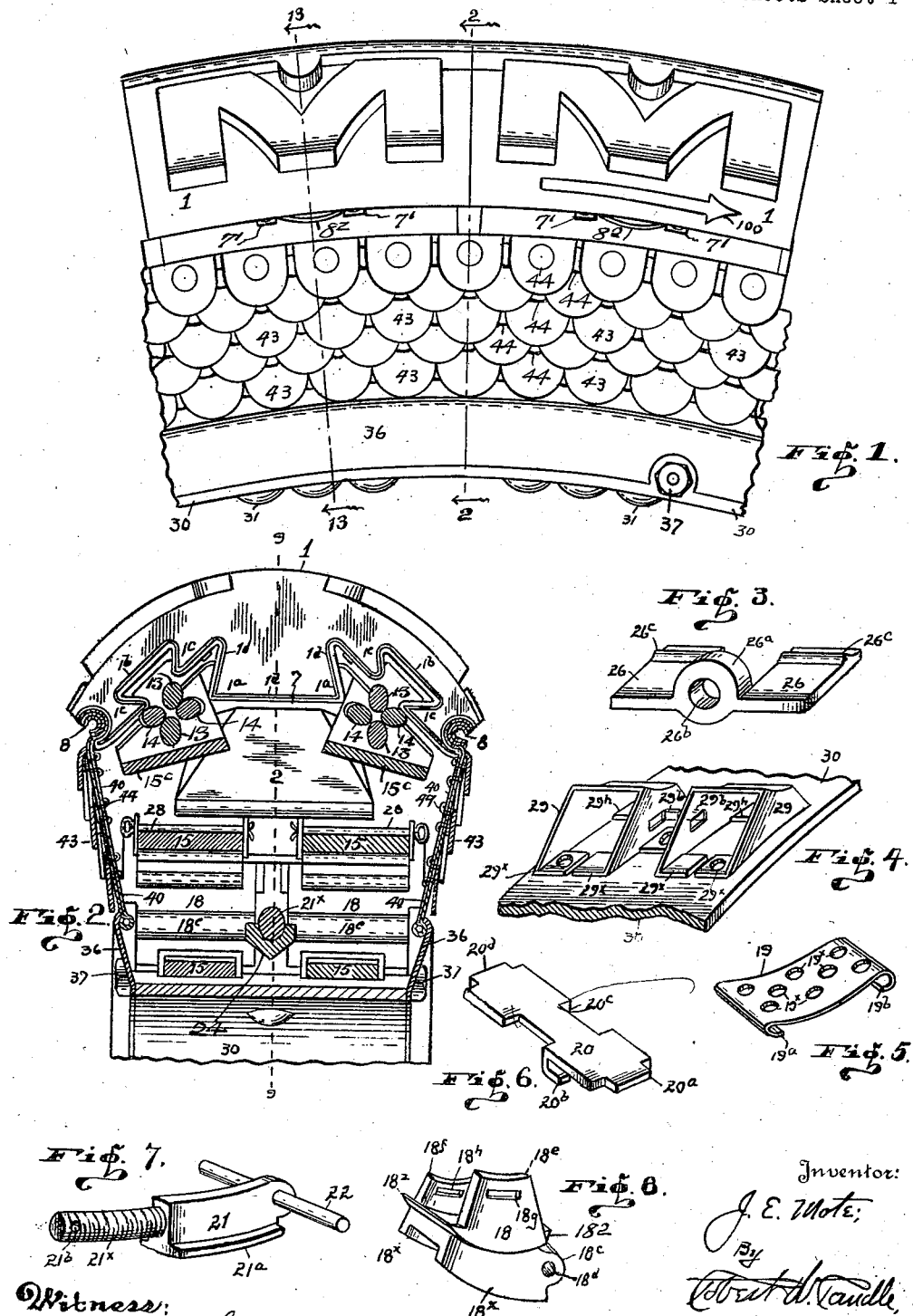

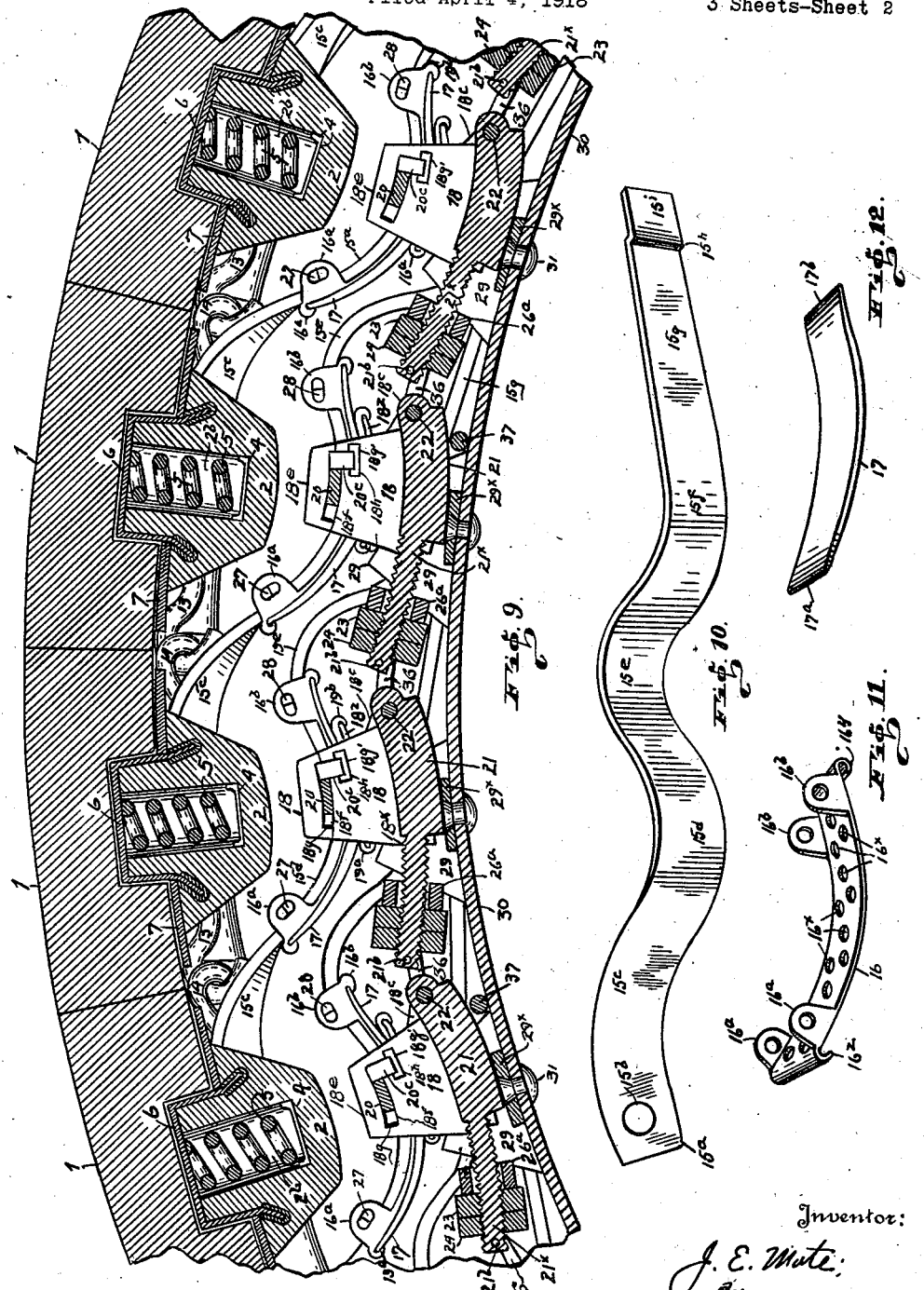

May 1, 1923.
J. E. MOTE
1,453,804
RESILIENT VEHICLE TIRE
Filed April 4, 1918
3 Sheets-Sheet 3
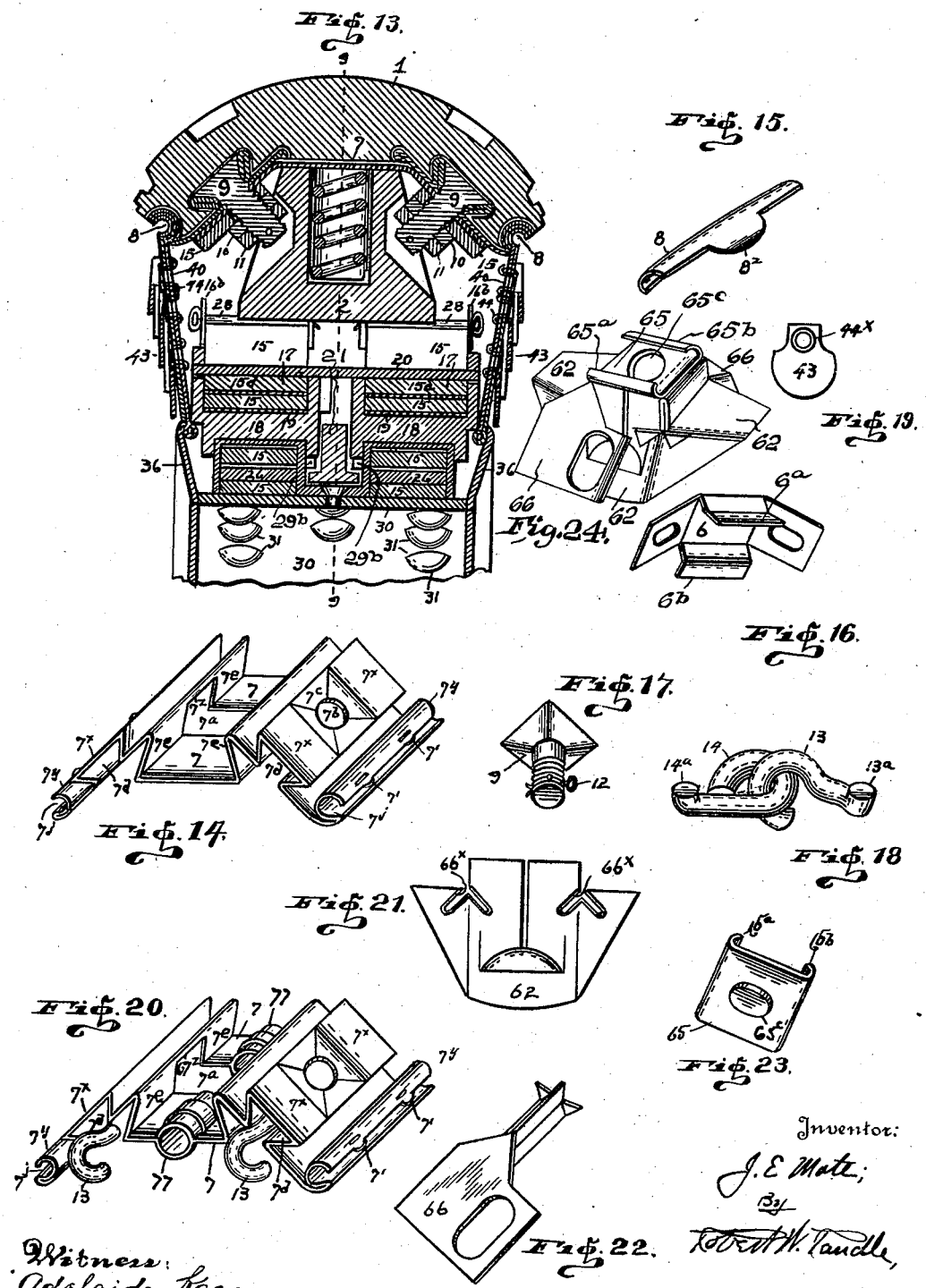

Patented May 1, 1923.

1,453,804

UNITED STATES PATENT OFFICE.

JOHN E. MOTE, OF DAYTON, OHIO.

RESILIENT VEHICLE TIRE.

Application filed April 4, 1918. Serial No. 226,721.

*To all whom it may concern:*

Be it known that I, JOHN E. MOTE, a citizen of the United States, residing in the city of Dayton, in the county of Montgomery, in the State of Ohio, have invented a new and useful Resilient Vehicle Tire, of which the following is a full, clear, and comprehensive specification and exposition, the same being such as will enable others to construct the same with exactitude.

The principles of this invention depend upon the resiliency of the thread sections and of springs which are enclosed in and form a part of the tire, and they are so arranged and secured, and limited in action by auxiliary means, as to obtain a maximum of radial, longitudinal, and lateral resiliency with a minimum danger of breakage, wear, or deterioration to the parts, and whereby I attain all of the attributes of a pneumatic tire without the inconveniences thereof.

The object of this invention, broadly speaking, is to provide a vehicle-tire which will be strong and durable in construction, neat and attractive in appearance, similar in proportions to tires now used, accessible for repairs, and capable of a high degree of efficiency in operation.

More specifically stated my object is to provide a vehicle wheel tire which dispenses entirely with pneumatics and relies entirely upon a plurality of metal springs, arranged circumferentially, in conjunction with resilient bumpers and tread sections, all of which are arranged, and retained in operative position, in novel manners, as hereinafter set forth.

The novelty of my invention and the advantages attained thereby reside in the features mentioned and in the details of construction, and in the arrangements of the parts, or in the mechanical equivalents thereof, which are incorporated in the mechanical conception, forming a unitary structure substantially as hereinafter set forth in concrete detail.

Certain of the means for carrying out the principles of my invention in a practical, a scientific, and a workable manner are shown in the accompanying three-sheets of drawings, in which—

Figure 1 is an exterior side elevation of a portion of a tire constructed in accordance with my invention. Figure 2 is a cross section of my tire, as taken on the line 2—2 of Fig. 1. Figure 3 is a perspective detail view of one of the double wedges alone. Figure 4 is a perspective detail view showing a portion of the inner rim, and showing one pair of spring-retaining pockets which are secured to said rim. Figure 5 is a perspective view of a bronze bearing strip or leaf, the same having means for retaining graphite or similar lubricant. Figure 6 is a perspective view of one of the steel retention strips. Figure 7 is a perspective view of one of the adjustment bolts and the dog which is integral therewith, the latter carries a pin which is at right-angles thereto, as shown. Figure 8 is a perspective view of one of the supporting chairs. Figure 9 is a longitudinal central section, taken through a portion of the tire, and as taken on the line 9—9 of Figs. 2 and 13. Figure 10 is a perspective view of one of the cantilever or main springs of my tire, Figure 11 is a perspective view of one of the main bronze anchor strips, the same being adapted to retain graphite or other lubricant. Figure 12 shows a leaf spring, termed an auxiliary spring, for supporting a main spring at its fulcrum. Figure 13 is a cross sectional view of the tire, as taken on the line 13—13 of Fig. 1. Figure 14 is a perspective view showing one of the sections of the outer sectional rim, and showing means for connecting various parts thereto, as hereinafter set forth. Figure 15 is a perspective view of one of the spring retaining cleats, which are employed for securing the fabric side walls of the tire to the outer sectional rim. Figure 16 is a perspective view of one of the sheet metal clips employed in connection with one of the one-part outer rim sections. Figure 17 is a perspective view of one of the square-head, flat faced, bolts for retaining the outer ends of the main springs. Figure 18 is a perspective view of one of the hook-and-eye hinges for the sections of the outer rim. Figure 19 is a plan view of one of the intermediate guard plates or scales which cover the sides of the tire. Figure 20 is a perspective view of one section of the outer sectional rim, showing the same in two parts, which parts are hinged together in the center. Figure 21 is a side elevation of one form of bumper, the same being employed with the rim sections shown in Fig. 20. Figure 22 is a perspective view of one of a pair of clips, the same being employed in connection with the two-part sections shown in Fig. 20. Figure 23 is a perspective view of one of the limitation plates employed in connection with the two-part sections of the outer rim. And Figure 24 is a perspective view showing the bumper 62 with the two clips 66 inserted therein and the member 65 showing the relations of these members in assembled form.

Similar indices denote like parts throughout the several views.

In order that the construction, the operation, and the advantages of my invention may be more fully understood and appreciated, I will now take up a detailed description of the several parts, which I will set forth as comprehensively and as fully as I may.

In order to simplify the description I will hereinafter describe one section of the tire, designating the parts by suitable indices, and will designate like parts of the other sections by the same indices, as all of the various parts of one section are identical with corresponding parts of all of the other sections; also where certain parts are in duplicate, or pairs, in one section I will designate each one by the same indicia as the other.

Referring now to the drawings in detail: Numeral 30 denotes the rigid and endless inner rim which serves as a supporting ring for parts of the tire that are not contacted with the roadway and which is adapted to fit around and to be secured to the periphery of the vehicle wheel in any well known manner, the said inner rim itself being supported from the roadway by certain tire parts which are closest to the roadway and being hereby designated as the supported vehicle-member.

The outer rim is composed of a plurality of sheet steel sections 7, shown in Fig. 14, which are arranged to form a continuous rim concentric with the rim 30 and spaced therefrom, and forming a flexible supporting means for the tread with the exception of the portion underlying the tread which is contacted with the roadway, when or in which case conditions are reversed and the tread supports that portion.

The sides of the sections of the outer rim are bent outward and slightly inward, forming the dove-tail sides $7^e$, from which they are bent to form the angular faces on each side, which in turn form the dove-tail channels $7^d$, then continuing laterally and inward, terminating in the pocket channels $7^j$ on each side, which pocket channels open out laterally, substantially as shown.

In the center of each face $7^x$ is an aperture $7^b$ for the stem of the bolt 9, and around said aperture is a depression $7^c$ for the head of the bolt 9, thereby permitting the face of the bolt-head to be flush with the face $7^x$. In the center of the section 7 there is provided a cut-away space $7^a$, having upper edges $7^z$ in the sides $7^e$, in order to receive the clip shown in Fig. 16, or when two-part sections, Fig. 20, are used then the lips $65^a$ and $65^b$ of the plate 65 (Fig. 23) engage under said edges $7^z$.

Each of the outer rim sections are united by the hook 13 engaging with eye 14, as in Fig. 18, the ends $13^a$ and $14^a$ being either welded or brazed to the sections 7, forming them integral as shown.

Tapering pockets 29 are arranged in pairs, as shown in Fig. 4, the same being formed of sheet metal, and they are formed with their faces or openings disposed at an angle with relation to the rim 30. Ears $29^x$ are bent in laterally and rest on the rim 30, to which they are secured by rivets 31. Likewise ears $29^h$ are bent in at the other ends of the pockets, and they also rest on the rim 30, to which they are likewise secured by similar rivets. Tongues $29^b$ are cut and bent in laterally, for the purposes hereinafter stated.

In Fig. 10 is shown one of the main cantilever springs, which are usually arranged in pairs, each spring comprising the outer end $15^a$ having its sides slightly rounded, and the inner portion $15^i$ which is united with the straight portion $15^g$ by the shoulder $15^h$. The central portion $15^e$ forms the arch, which merges at its inner portion with the bend $15^f$, and with its outer portion merging into the supporting bend $15^d$, the latter merging into the portion $15^c$ which is given a one-eighth bend or twist corresponding with the angle of the face $7^x$, thereby forming a surface-bearing contact back of said face. Formed through the outer end portion is the aperture $15^b$ to receive a bolt 9, and the part $15^i$ is adapted to rest on the rim 30, fitting between the ears $29^x$ and $29^h$ to prevent longitudinal movement of the spring. The outer end of each of the main springs is secured to a section 7 by means of a bolt 9, the latter passing through the aperture $7^b$ of a section and the aperture $15^b$ of a spring, where it is locked by means of nuts 10 and 11, and by the cotter-pin 12, whereby the main spring may have a slight pivotal movement on the bolt 9. The spring 15 has an arched bend $15^e$ and a second bend $15^d$ whereby the length of the spring will vary according to whether it is subjected to compression or tension, the said bends increasing or decreasing in curvature under such conditions. As portions of said arched bends rise higher from the inner rim they contact with the spring leaves 17 of the adjoining set of springs thereby limiting their movement and transferring a certain part of the load to the next set of springs, and likewise a spring leaf 17 may be deflected into contact with an arched bend of an adjoining set of springs, thereby accomplishing the same results in a reverse direction.

The inner portion of each main spring is anchored as follows:

As previously stated, the part 15$^i$ rests on the rim 30, fitting between the ears 29$^x$ and 29$^h$. Numeral 26 denotes a double wedge (Fig. 3) comprising two parts connected by the sleeve 26$^a$, which has an aperture 26$^b$ therethrough on the same plane as the top of the wedge 26. The wedge 26 rests on two main spring portions 15$^i$, the sides of the two parts fitting between the sides of the respective pockets and the sleeve 26$^a$ located between the pockets.

A second pair of main springs pass through said pockets, resting on the ridges 26$^c$ of the wedge 26, over which they may have a rocking or teetering movement. However the latter pair of main springs extend therebeyond, to the right, with their ends likewise secured in the next pockets to the right.

Numeral 18 denotes a wedge-shaped chair or block, having downwardly projecting side flanges 18$^x$ which fit against the outer sides of the pockets 29, with upwardly projecting side flanges 18$^e$ and 18$^f$ between which are located the graphite-filled bronze plate 19, the spring leaf 17, and the strip or plate 16, and the next main spring resting on the latter, as shown in Fig. 9. The plate 19 has a plurality of small apertures 19$^x$, adapted to be filled with graphite or other lubricant and hooks 19$^a$ and 19$^b$ are formed on the underside of each end of said strip 19, as shown in Fig. 5.

Extending from the right and the left sides of the chair 18 are the lips 18$^z$, shown in Figs. 8 and 9, over which engage the hooks 19$^a$ and 19$^b$ of the plate 19. The spring leaf 17, or primary auxiliary resilient means, acts as a support for the main spring and thereby contributes to the support of the sectional rim resiliently against impact from any exterior direction which may be applied thereto when the wheel is in operation.

The bearing strip or plate 16 is provided with a plurality of apertures 16$^x$ throughout its length to retain graphite or other lubricant, and on the underside of each end thereof are formed the hooks 16$^z$ and 16$^y$ to engage over the rounded ends 17$^a$ and 17$^b$ of the leaf 17. Extending up from the side edges and near each corner of the strip 16 are the ears 16$^a$ and 16$^b$, arranged in pairs, each having an aperture therethrough, as shown in Fig. 11, which apertures are adapted to receive the respective cotter-pins 27 and 28.

The part 15$^d$ of the main spring rests on the strip 16, and between said ears 16$^a$ and 16$^b$, after which the cotter-pins, or bolts, 27 and 28 are inserted through the said holes in the ears, as shown.

The retention bar or strip 20, Fig. 6, terminates on each end in tongues 20$^a$ and 20$^d$ which fit into apertures 18$^g$ in the chairs 18 and it is also provided with central tongues 20$^b$ and 20$^c$ which fit into apertures or recesses 18$^h$ in the inner flange of each chair 18.

Numeral 21 denotes one of the adjusting dogs, which carries the pin 22 extending at right-angles thereto, and having flanges 21$^a$ on its lower corners which pass underneath the tongues 29$^b$.

Extending from the left end of the dog 21 is the bolt 21$^x$, integral therewith, which has a cotter-pin hole 21$^b$ formed through the free end thereof, whereby the nuts 23 and 24 may be prevented from coming off by means of a cotter-pin inserted through the hole 21$^b$.

The chair 18 has an extension 18$^c$ projecting to the right from its lower portion and whose ends are in line with the flanges 18$^x$, with an aperture 18$^d$ therethrough in which is disposed the end portion of the pin 22, which permits of vertical swinging on the dog 21. The bolt 21$^x$ extends through the aperture 26$^b$, and to the left thereof the nuts 23 and 24 are threaded on said bolt, and they are retained in place by inserting a cotter-pin in the aperture 21$^b$.

The said nuts 23 and 24 may be turned to force the chair 18 to a higher level when desired, thereby pushing upon the main spring and thereby providing means for adjusting the resiliency or tension of the main spring according to the weight of the load to be carried.

Numeral 1 denotes each of the several tread-sections which are formed of rubber or the like. In Fig. 2, at 1$^a$ and 1$^c$ it is shown how the tread sections are dove-tailed into connection with the respective rim sections 7, and it is also shown how the rim sections are dove-tailed into the tread sections, and in addition thereto the tread sections are cemented to the rim sections, whereby each tread section is practically integral with its respective rim section. It is also to be understood that the entire inner or contacting surface of each tread section is lined with fabric 1$^d$, that is the inner surface of the tread section is spaced from the rim section and the clip by said fabric, the same being vulcanized to the rubber of the tread section.

The circumferential tread line of the tire is the central peripheral portion of the tire formed by the assembled tread sections 1, and it is particularly shown by the outermost curved line of the sections 1 in Figure 9.

Numeral 2 denotes the resilient bumper, or secondary resilient means, one for each tread section, each being located directly below, or centerward, from its section 1, and directly outward from its chair 18, each bumper being adapted to contact with a pair of the chairs, from which it is normally spaced, as in Fig. 9. Their upper ends are secured between the members of each pair of the main springs, substantially as shown.

The stem of each bumper 2 extends up into its section 1, it being located in its sheet metal clip 6, where it is locked as in Fig. 9.

The end portions of the clips 6 are located in fabric lined cavities therefor formed in the rubber of the bumper 2, as in Fig. 9. A round aperture $2^b$ is formed down into each bumper 2 in which is located a sheet metal cup 4 in which rests the coil spring 5, forming also secondary auxiliary resilient means, with its upper end contacting with the central portion of the clip 6. The diameter of the spring 5 being less than the diameter of its aperture $2^b$, in order that said spring may operate freely therein.

The clip 6 is adapted to secure the bumper 2 to the outer rim. Also said clip 6 is provided with slotted ears, 6' and 6" Fig. 16, to facilitate assembly and to provide limitations for the movements of one outer rim sectional part with relation to the other sectional part of the same section. Said clip 6 also has flanges, $6^a$ and $6^b$ Fig. 16, adapted to engage in the bumper 2 to secure the said bumper thereto, substantially as shown.

Extending out radially from each side of the rim 30 are the side rings or plates 36, to the outer edges of which are secured the inner wire inserted edges of the fabric 40. The said fabric 40 is then extended outward in line with said plates 36 with their outer edges disposed in the respective channels $7^j$ where they are detachably secured to each rim section by one of the spring cleats 8 shown in Fig. 15. Said channel $7^j$ is formed by the roll $7^y$, Fig. 14, forming a narrow mouth for the insertion of the edge of the fabric and of the spring cleat 8. Said cleat 8 is retained, and locked against movement, by the lips 7' which are bent inward to engage the edge of the cleat 8, one on each side of a tail piece $8^z$ by which it may be manipulated when being removed.

Said plates 36 are secured to the rim 30 by the bolts 37, as shown.

The surfaces of the fabric sides 40 are covered by laminated armor plates 43, which are secured to the fabric by hollow rivets 44, thereby protecting the fabric from damage. The plates which form the outer row of the armor differ from the other plates 43 in that their outer portions are formed full width and are bent so that the edges of the bent portions contact with the fabric 40. And the inner ends of the plates which form the inner row of armor plates are cut off and their edges contact with the ring 36, as shown in Figs. 2, 1 and 13. And the spaces between the plates 43 of a row are greater than the similar spaces in a row inside of the first row.

In practice the tire should be built up in substantially the manner described, whereby the main springs extend across the interior of the tire in laminated form, projecting inward, in the direction of rotation, toward the inner rim, but normally without contact with each other, there being a pair of the main springs making contact with the central portion of each outer rim section, and each pair of the main springs being secured at their inner ends, anchored at a second point, and having sliding connection with two of the chairs 18 in the manner set forth.

After the interior parts are assembled then the armored fabric sides may be attached in place, which will enclose the working parts as shown, after which the tire may be attached to a wheel in the same way that a pneumatic tire with its rim is secured.

In order to give the best results the tire should be placed on its wheel in such manner as to revolve in the direction indicated by the arrow 100, Fig. 1, which is formed on the thread sections.

Normally the bumpers 2 will not be in contact with the retaining strip 20 or the heads of the chair or blocks 18, but when loaded to a certain extent, or in passing over roughness in the roadway, then the bumpers may contact with the heads of the chairs, or with the strip 20, which will absorb the shocks and prevent the main springs from being unduly strained. Also the bumpers, coil springs, treads and main springs together will absorb the jars under heavy loads, but with lighter loads the main springs will be free to simply transmit traction and afford resiliency similar to that of pneumatic tires.

Also it will be observed that the shape of the main springs are such as to absorb not only the vertical jars but also the longitudinal and side thrusts or lateral movements of the vehicle, which manifestly must be provided for and taken care of. It will also be seen that the arches $15^e$ of the main springs are so placed that when the tire is very heavily loaded that they will contact with the spring leaves 17, thereby transferring a certain part of the excess load to the next set of main springs.

In practice the fabric sections 40 are rubber treated, or otherwise made waterproof, and they not only protect the interior mechanisms but they also act as rebound limitations for the outer rim, since they are secured to both the outer and the inner rims of the tire. It is also to be understood that all parts which are capable of being sherardized, or otherwise made rust proof, are so treated whereby deteriorization will be practically nil.

As has been observed, the sections of the outer rim are connected together circumferentially by hooks and eyes, thereby forming hinges possessing the qualities of universal joints with limits, and also providing for a certain amount of lost motion and freedom in action, while the joints are retained tight by pressure of the tread sections against each other, the ends of the tread sections being resilient and in compressed contact with each other they tend to normally retain the tread in circular form and the sections in longitudinal alignment with each other, the resiliency increasing when the tread is deflected in any direction. Each tread section is longer than the radial or circumferential space allowed for it in the assembled tire tread so that the ends are compressed when assembled which prevents the picking up of stones or other material when the tread sections are deflected, and it also prevents the ends of the sections from sloughing off and wearing back, as the joints never open, and it is known that compressed rubber has greater resistance to wear, puncture, or damage.

It is to be understood that the two-part rim construction shown in Figs. 20, 21, 22 and 23 is one of the important features of this invention, and in fact will perhaps be more largely employed than the one-part rim section construction, in which corresponding parts are shown in Figs. 14 and 16, in fact two of the members 66 (Fig. 22) and one of the members 65 (Fig. 23) are equivalent to the clip shown in Fig. 16, taking the place thereof when the two-part construction is employed. The clips 66, the plate 65, together with the graphited bushed central hinging 77 (Fig. 20), and the split bumper 62 (Fig. 21) form the essential features of the hinged two-part rim construction.

Two of the clips 66 are adapted to be inserted through the bumper 62, one in each of the slots 66ˣ, being inserted in opposite directions to each other. The member 65 rests on the stem of the bumper 62 between the two clips 66, with the hooks 65ᵃ and 65ᵇ adapted to engage the portions 7ᶻ of the rim section parts, thus forming a limitation in one direction for the movement of one rim section part with respect to the other part of the same section.

The spring 5 engages the plate 65 around the boss 65ᶜ.

The bumper 62 is identical in shape and size with the bumper 2 except that the slots 66ˣ in the bumper 62 are V-shaped or double as compared with similar slots in bumper 2 and the bumper 62 is centrally slitted part way down from the top or outer portion thereof in a plane that is transverse to the circumferential tread line of the tire.

The said slit divides the upper or outer portion only of the bumper into equal parts so that the outer portion of one part is free to move with respect to the outer portion of the other part. The lower or inner portion of the said bumper 62 joins the two above mentioned divided parts and, being flexible, permits the movement of one of the parts with respect to the other equal part. The half-round shaded portion at the inner terminal of the said slit is one of the recesses on each side of the bumpers 62 and 2 which recesses provide spaces for the inner ends of the bolts 9.

The bumper 62 is employed with the two-piece construction instead of the bumper 2 which is used with the one-piece construction, and the hinge 77 is employed in the two-part rim construction.

It is evident that the bumpers with enclosed springs can be compressed only a limited amount after contacting with the spring retaining strips 20. It is also evident that two portions 7ᵉ of the one-piece rim sections connecting the two halves of each rim section, are flexible, and act as a hinging means within limits permitting some movement of one-half with respect to the other half of said rim section and that the movement one way is limited by the travel of the bolts 9 in the slots of the clip 6, and in the opposite direction by parts of the tread shown at 1ᵈ in Fig. 2, which is interposed between said halves.

The outer rim sections are formed into channels, troughs or recesses by folds or bends and reverse bends therein.

These channels extend in a direction approximately parallel with the circumferential tread line of the tire.

The material of the rim sections is flexible so that the said bends or folds permit the parts of each outer rim section to move independently of each other in a direction transverse or lateral with respect to the circumferential tread line of the tire.

The outer rim sections are a flexible support to the various longitudinal portions of the tread and the inner rim or ring is an inner support to these longitudinal portions of the tread, through the outer rim and the springs which connect the two rims.

It is further evident that while most parts of the tire are supported from the inner rim or ring the majority of the time, and are herein so described, that when in operation some portion of the tread contacts with the roadway, so that it and a corresponding portion of the outer rim are a support to the inner rim or ring through springs that connect them to the said inner rim or ring which springs form the resilient vehicle-supporting means, the outer terminal or end portion of each of such springs being indirectly attached to and interlocked with the said tread portion and supported thereby. The inner terminal or end portion of each such spring is anchored to the inner rim or ring hereby designated as the supported vehicle-member, while the central portion of each such spring is formed into curves adapted to permit the lengthening or shortening of the length of such spring when measured on a straight line. The said central portion of each such spring supports the inner rim or supported vehicle-member through means the height or length of such latter means being variable by adjustment, said means being adapted to permit longitudinal movement of the said central spring portion with respect to the said supported inner rim or vehicle-member; adapted to lubricate contacted sliding surface during such longitudinal movement and adapted to permit the said central spring portion to have an oscillating, teetering, or rocking motion with respect to the said supported inner rim or supported vehicle-member.

I desire that it be understood that various changes may be made in the several details of construction, and in the arrangement and the combination of parts, from that herein shown and described, without departing from the spirit of my invention, and without sacrificing any of the advantages thereof.

Having now fully shown and described the principles of my invention, what I claim and desire to secure by Letters Patent of the United States, is—

1. A vehicle tire comprising an inner rim, an outer sectional and flexible rim, resilient cantilever springs interposed between said rims, one portion of each spring being detachably connected to an outer rim section, another portion of each spring being attached to the inner rim thereby forming between the said rims a flexible connecting means which is adapted to permit movement of each outer rim section laterally also to a tilted position with respect to its normal position, and means connecting each section to adjoining sections which latter means is adapted to permit the said lateral and tilting motions of each outer rim section.

2. A vehicle tire comprising an inner rim, an outer flexible rim, single-leaf springs connecting said rims and having bearing contacts with the outer rim, pivots connecting the outer ends of said springs to the outer rim, the axial lines of said pivots being disposed at acute angles with relation to the plane of the tire.

3. A vehicle tire comprising an inner rim, an outer sectional and flexible rim, fabric elements connected independently to different outer rim sections on opposite sides of said sections, each rim section being transversely flexible within itself, and means for connecting said fabric elements with the inner rim thereby enclosing the space between the outer and the inner rim.

4. A vehicle tire comprising an inner rim, an outer sectional rim, each outer rim section being transversely flexible in itself, each longitudinal half portion of said rim sections being connected to the inner rim and connected to adjoining rim sections by means which are adapted to permit the tilting of the said longitudinal half portions of the said rim sections in any direction.

5. Combined in a vehicle tire, an inner rim, an outer flexible rim, resilient springs having terminal connections with the said rims and interposed between them, a connection between the inner rim and the central portion of each spring through contacted surfaces, one surface being adapted to move with respect to the surface with which it is contacted, and means for lubricating the said surfaces.

6. A vehicle tire comprising an inner rim, an outer rim, a plurality of ears attached to the inner rim, a plurality of sections hinged together forming said outer rim, a series of curved springs pivotally connected at one end to the sections of the outer rim, and means for securing the other ends of said springs between pairs of said ears carried by the inner rim, the said ends being secured so as to permit oscillation of said springs.

7. In combination, an inner rim, an outer rim comprising sections, resilient means connecting said rims, each of the said sections of the outer rim connected at locations laterally spaced from each other to separate units of the said resilient means, and each section being transversely flexible intermediate of said connections.

8. A vehicle tire comprising an inner rim, an outer sectional rim, each outer rim section being flexible within itself and connected to adjoining rim sections by means adapted to act as universal joints, and resilient means attached to the inner rim and attached to the outer rim sections thereby providing means adapted to permit lateral movement of each outer rim section from its normal position.

9. A vehicle tire comprising an inner rim, an outer sectional flexible rim, resilient means interposed between said rims, a tread surrounding the outer rim, longitudinal dove-tailed constructions for securing the tread to the outer rim, and locking means adapted to be secured in recesses in the tread thereby providing means to prevent longitudinal slipping of the tread.

10. A vehicle tire comprising an inner rim, an outer sectional rim, resilient means connecting said rims, the sections of the outer rim being connected by means adapted to act as universal joints, and each outer rim section being divided longitudinally into parts having hinged connection with each other.

11. A vehicle tire comprising an inner rim, an outer rim, cantilever springs, interposed between said rims and pivotally attached to the outer rim and oscillatingly attached to the inner rim, and rebound limitations connecting said rims.

12. A vehicle tire comprising a rigid inner-rim, an outer sectional flexible rim spaced concentrically from the inner rim, a plurality of cantilever springs interposed between the rims and connected thereto, said springs being arranged to overlap each other, chairs for the springs, each chair forming an adjustable fulcrum for its spring, means for securing the inner end of each spring in a pocket remote from the pocket and the chair forming the fulcrum for that spring.

13. A vehicle tire comprising a rigid inner rim, an outer sectional rim, means for hinging together the sections of the outer rim, cantilever springs interposed between the rims and connected thereto, each spring arranged to overlap the next spring, a chair forming a support for each spring, means for adjusting each chair, a pocket for each spring, the same being secured to the inner rim, means for securing the inner end of each spring in a pocket, and means for forming a sliding connection for each spring with the inner rim.

14. A vehicle tire comprising a rigid inner rim, an outer sectional rim, universal joints connecting the sections of the outer rim, a plurality of cantilever springs anchored to the inner rim and pivotally connected to the outer rim, supports for slidably retaining and supporting said springs, the same being carried by the inner rim, a sectional resilient tread surrounding the outer rim and interlocked into connection therewith, resilient bumpers extending inward from the outer rim and each adapted to engage the head of one of said supports, and cushioning means in said bumpers.

15. A vehicle tire comprising an inner rim, an outer flexible rim, cantilever springs connecting the said rims, auxiliary leaf springs supporting the central portions of the said cantilever springs, and supports for the said auxiliary leaf springs from the inner rim.

16. A vehicle tire comprising a rigid inner rim, an outer sectional rim, elongated cantilever springs extending between the rims and having connection therewith, a resilient bumper extending inward from each section of the outer rim to form auxiliary resilient means.

17. A vehicle tire comprising a rigid inner rim, an outer sectional rim, resilient means connecting the two rims, a bumper for each section of the outer rim and forming auxiliary resilient means between the rims, and a coil spring inclosed in each bumper.

18. A vehicle tire comprising a rigid inner rim, an outer sectional rim, cantilever springs connecting the rims, means for connecting the springs to the inner rim, means for connecting the springs to the outer rim, intermediate supports for the springs, means for adjusting the intermediate supports, and a bumper extending inward from each section of the outer rim, and a spring carried in each bumper, all substantially as shown and described.

19. In a vehicle tire comprising a rigid inner rim, an outer sectional rim, cantilever springs connecting said rims, each of said springs being disposed across from one rim to the other, there being an aperture formed through the outer end portion of each spring, an offset formed near the inner end of each spring, there being a slight twist in one portion of each spring, and gradual curves being formed throughout the length of the springs, means for securing each spring to the outer rim, means for securing said springs to the inner rim, and means for slidably supporting said springs intermediate their lengths.

20. In a vehicle tire comprising a rigid inner rim, an outer rim comprising a plurality of sections, universal joints connecting the sections, each section being divided longitudinally into two parts, means for hinging the two parts together, means for limiting the movements of the two parts with relation to each other, a tread section secured to each of the sections of the outer rim, cantilever springs connected to the inner rim, and means for connecting the springs to the outer rim sections.

21. A vehicle tire comprising an inner rim, an outer rim formed with sections hinged together, cantilever springs connected with said rims, means for securing the inner end of each of said springs to the inner rim, means for anchoring a second point on each of said springs to the inner rim, and means for supporting, from the inner rim, a third point on each of said springs.

22. A vehicle tire comprising a rigid inner rim, an outer flexible rim, springs forming means connecting said rims, means for oscillatingly securing each of said springs to a point on the inner rim, and means for supporting said springs from another point on the inner rim.

23. A vehicle tire comprising an inner rim, an outer rim formed of sections hinged together, each section being composed of two longitudinal halves connected together by hinging means, means for limiting the movements of each half section with relation to the other half of the section, a tread attached to the outer rim, and resilient means connected with both of said rims.

24. A vehicle tire comprising an inner rim, an outer sectional rim, springs interposed between and connecting said rims, resilient bumpers interposed between said rims, the said bumpers each having a chamber therein, thereby providing means for internal expansion of the bumper material.

25. A vehicle tire comprising an inner rim, an outer flexible rim, a tread surrounding the outer rim, means for interlocking the tread and the outer rim together thereby preventing longitudinal movement of one with respect to the other, cantilever springs connecting the said rims and curves in each spring thereby providing means for resilient longitudinal movement of the tread with relation to the inner rim.

26. A vehicle tire comprising a rigid inner rim, an outer rim comprising a plurality of sections transversely hinged together and longitudinally hinged together, and resilient means interposed between said rims.

27. A vehicle tire comprising an inner rim, an outer sectional rim, springs disposed between said rims, means for attaching the outer end portion of each spring to the outer rim, means for securing the inner end portion of each spring to the inner rim, and lubricated supporting means intermediate of the end portion attachments of each spring, adapted to slidably support the said spring.

28. A vehicle tire comprising an inner rim, an outer sectional rim, a plurality of cantilever springs each having an arched bend intermediate of its ends, means for attaching one end of each spring to the outer rim, means for securing the other end of each spring to the inner rim, and means for limiting the movements of said bends of the springs.

29. A vehicle tire comprising an inner rim, an outer sectional rim, a plurality of cantilever springs extending between said rims, each of said springs having one end portion thereof turned at an angle with relation to the other end thereof, means for attaching said springs to an angular portion of the outer rim, and means for securing the other end of each spring to the inner rim.

30. A vehicle tire comprising an inner rim, an outer rim consisting of a plurality of sections, means for hinging the sections of the outer rim together, a plurality of cantilever springs each secured at one end to the inner rim with its other end attached to one of the sections of the outer rim, each of said springs being formed with curves intermediate its end attachments and having one end portion thereof twisted at an angle with relation to the other portion thereof.

31. In combination a vehicle tire, comprising a plurality of overlapping cantilever springs each formed with curves intermediate its ends, a shoulder formed near one end of each spring, there being an aperture formed through the other end portion of each spring, and a twist, which is less than a half-twist, formed in each spring whereby one portion of each spring is disposed at an angle with relation to the other end portion thereof.

32. Combined in a vehicle tire, an inner rim, an outer rim, cantilever springs disposed between said rims with the central portion of each spring formed in a curved convex with relation to the inner rim, and means carried by the inner rim for supporting the central portion of each spring.

33. A vehicle tire comprising an inner rim, an outer flexible rim, cantilever springs detachably connected to said rims and each spring formed in curves thereby providing means for the shortening also the lengthening of its longitudinal length.

34. A vehicle tire comprising an inner rim, an outer rim, resilient means connecting said rims, and supporting means located intermediate the ends of said resilient means, said supporting means being attached to the inner rim, the parts of the same being pivotally interlocked together.

35. A vehicle tire comprising an inner rim, an outer rim, a plurality of springs pivotally connected to the outer rim and oscillatingly connected to the inner rim, and means for slidably supporting said springs intermediate their ends.

36. A vehicle tire comprising an inner rim, an outer rim composed of a plurality of sections hinged together for limited universal motion, a single leaf spring pivoted to each section of the outer rim, means for slidably supporting each spring at its central portion, and means for oscillatingly connecting each spring to the inner rim.

37. A vehicle tire comprising a rigid inner rim, an outer flexible sectional rim, each outer rim section being composed of parts longitudinally hinged together, a fabric attached by means to the inner rim, means for securing the outer edge portion of the fabric to each of said outer rim section parts independently of its attachment to a similar part of another rim section.

38. A vehicle tire comprising a rigid inner rim, an outer rim comprising a plurality of section parts transversely hinged to adjacent section parts and longitudinally hinged to other adjacent section parts, and resilient means interposed between the rims.

39. A vehicle tire comprising an inner rim, an outer flexible rim, springs interposed therebetween, a fabric connected to each rim, armor plates secured to said fabric, attachments for securing the said plates, the said attachments being adapted to permit independent movement of each armor plate with relation to other armor plates.

40. Combined in a vehicle tire, an inner rim, a tread spaced from the inner rim which tread is flexible radially and transversely, laterally spaced sectional supports for said tread, means adapted to permit lateral tilting of each of said supports independently from another support laterally spaced therefrom, and resilient means connecting said supports and the inner rim.

41. A vehicle tire comprising an inner rim, an outer sectional rim, a tread section attached to each rim section, said tread sections being provided with resilient ends, the circumferential length of said tread sections not assembled being longer than the circumferential length of the space provided for them in assembled form.

42. Combined in a vehicle tire, an inner rim, an outer flexible rim, tread sections surrounding the outer rim, compressed end portions of said tread sections contacted against ends of adjoining tread sections adapted thereby to form water-tight and non-separable joints between the tread sections, and resilient means interposed between said rims.

43. In combination cantilever springs having one terminal portion of each spring attached to a supported vehicle-member, having the central portion of the said each spring formed into curves adapted to permit motion of the said central portion of the said spring with respect to the said supported vehicle-member in a direction longitudinal of the said spring, means interposed between the said supported vehicle-member and the said central spring portion which means is adapted to permit the aforesaid motion of the said central spring portion, there being a portion of the said spring other than the above said terminal portion, the above said central portion and the portion between them, supported from the roadway and means adapted to support the said spring from the roadway.

44. In combination, cantilever springs each of which has one terminal portion thereof attached to a supported vehicle-member and has means in the said each spring adapted to permit motion of the central portion thereof with respect to the said supported vehicle-member in a direction longitudinal of the said spring and adapted to permit a rocking motion of the said central spring portion, means interposed between the said supported vehicle-member and the said central spring portion, which means is adapted to permit the aforesaid motions of the central spring portion, and means adapted to support the said spring from the roadway there being a portion of the said spring other than the above said terminal portion, the above said central portion and the portion between them which is supported from the roadway.

45. In combination, a resilient tread of a vehicle tire, a flexible support underlying the said tread and supporting longitudinal portions thereof, and adapted to permit one portion of the said flexible support underlying the tread to move with respect to the other transversely adjacent portions thereof in directions transverse with respect to the circumferential tread line of the tire, an inner support for the said longitudinal portions of the tread which inner support is inward from the flexible support underlying the tread and spaced therefrom, and resilient means interposed between the said inner support and the flexible support underlying the tread.

46. In combination, a resilient tread of a vehicle tire adapted to contact with the surface of a roadway and having a flexible support underlying said tread, means adapted to permit the transversely adjacent portions of the said flexible support which are nearest to the surface of the roadway to move with respect to each other and with respect to other adjacent portions of said flexible support into positions more nearly parallel with the surface of the roadway with which the said tread contacts than they would occupy if the tire is not contacted with the surface of the roadway, an inner support for said tread which inner support is inward from the flexible support underlying the tread and spaced therefrom, and resilient means interposed between said inner support and the flexible support underlying the tread.

47. In combination, a resilient tread of a vehicle tire, a flexible support underlying the said tread and supporting longitudinal portions thereof, and adapted to permit one portion of the flexible support underlying the tread to move with respect to other portions thereof in directions longitudinal and transverse with respect to the circumferential tread line of the tire, an inner support for the said longitudinal portions of the tread which inner support is inward from the flexible support underlying the tread and spaced therefrom, and resilient means interposed between the said inner support and the flexible support underlying the tread.

In testimony whereof I have hereunto subscribed my name to this specification in the presence of two subscribing witnesses.

JOHN E. MOTE.

Witnesses:
 ROBT. W. RANDLE,
 R. E. RANDLE.